Aug. 22, 1933.  J. J. BRELL  1,923,073
ELECTRICAL CONNECTION DEVICE
Filed July 22, 1932
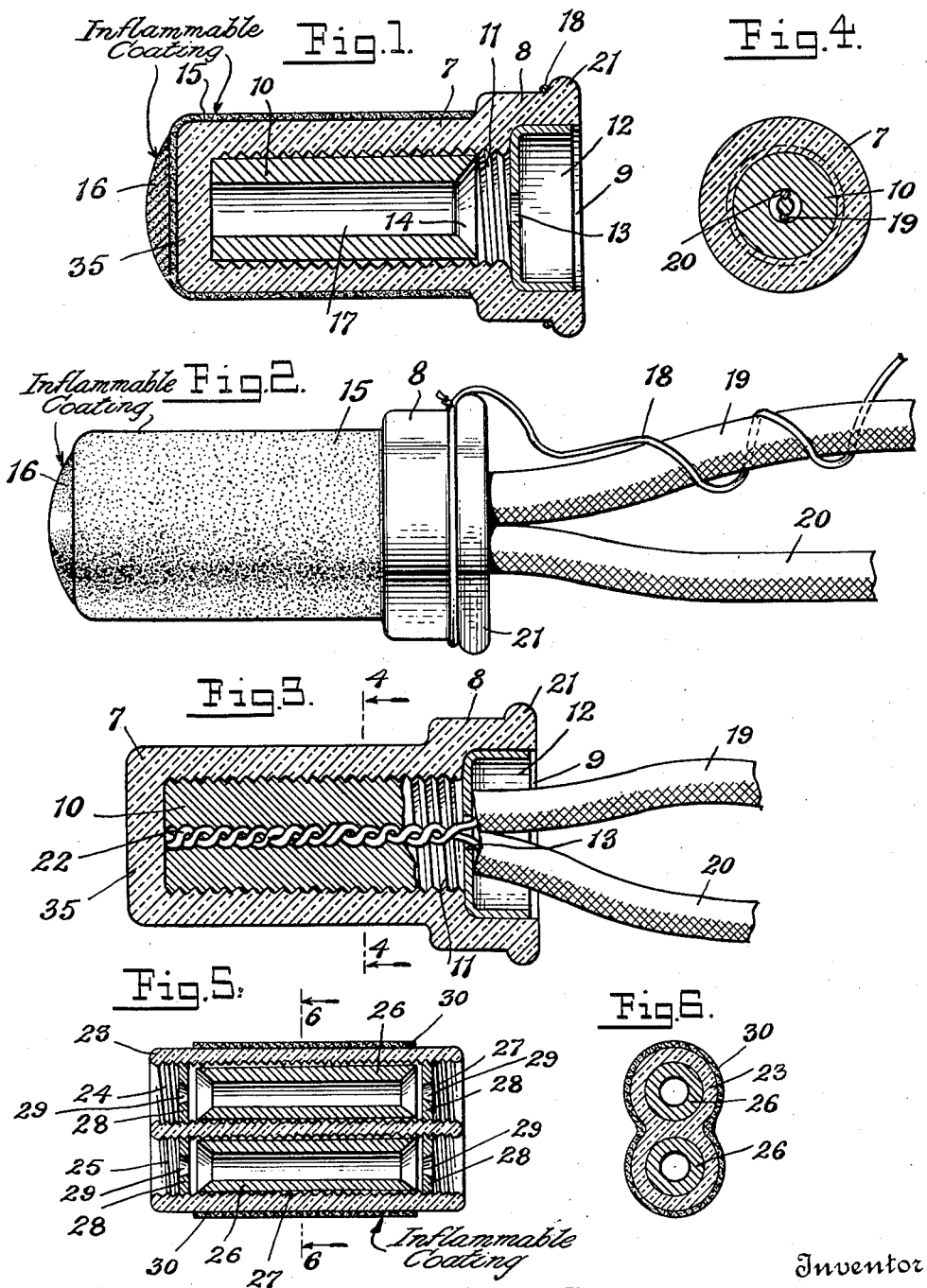
Inventor
Jules J. Brell
By his Attorney
Harry Radzinsky Patented Aug. 22, 1933

1,923,073

UNITED STATES PATENT OFFICE 1,923,073

ELECTRICAL CONNECTION DEVICE

Jules J. Brell, New York, N. Y., assignor of one-third to Harry Radzinsky, New York, N. Y.

Application July 22, 1932. Serial No. 624,018

12 Claims. (Cl. 173—263)

This invention relates to a connection device for joining electric wires. Usually wires in an electric circuit, and particularly in house wiring circuits, are joined together by soldering the bared and twisted ends of the wires, and then insulating this joint by wrapping it with rubber or friction tape. In some cases an internally threaded nipple is placed over the bared ends of the wires, the nipple being provided with internal threads which cut a thread into the wires. These nipples may be applied over a splice or joint more rapidly than the soldered and tape-wrapped joint can be made, but have numerous shortcomings. One deficiency is that they do not always tightly hold in position when applied to stranded wires. Another deficiency is that when they are applied to wires of relatively small diameter they sometimes cut through the wires and break them, causing a short-circuit. A further deficiency is that these nipples have to be made in various sizes so that they may accurately fit the various kinds and sizes of wire used for electric wiring.

My invention contemplates the production of an insulating nipple or shell wherein the advantages of a soldered and insulated joint is attained, and the deficiencies of the ordinary nipple are remedied. The invention also contemplates the formation of a soldered joint without the use of a soldering torch or other separate heat-supplying means.

The advantages of an article of this kind to the electrician will be apparent, since it obviates the use of a soldering iron or torch, insulating tape and the like. In fact, an electrician equipped with a few simple tools, a box of matches and a supply of these devices can wire a house more efficiently than one burdened with soldering equipment, insulating tape and other tools required to connect and insulate the wire joints according to old methods.

Specifically, the invention consists in the use of a nipple or shell made of insulating or non-conducting material, provided on its inside with a fusible material or solder and on its outer surface with an inflammable heat-creating substance which may be easily ignited by a match or by an igniting preparation provided on the shell. The inflammable heat-creating substance when ignited serves to render the solder in the shell, molten so that the solder will fuse with the bared ends of wires inserted into the shell and hold the shell securely over the wires and provide an insulating covering therefor.

In the accompanying drawing Fig. 1 is a longitudinal sectional view of an electrical connection device made in accordance with my invention; Fig. 2 is a side view of the same showing the device in position over the ends of two wires and ready for the ignition of the inflammable heat-creating substance to melt the solder within the shell and permanently hold the ends of the wires therein; Fig. 3 is a longitudinal sectional view of the connection device after the solder has become molten and then hardened to securely hold the wires in position; Fig. 4 is a sectional view on the line 4—4 of Fig. 3, looking in the direction of the arrows; Fig. 5 is a longitudinal sectional view of a modified structure; and Fig. 6 is a sectional view on the line 6—6 of Fig. 5, looking in the direction of the arrows.

In the embodiment of my invention disclosed in Figs. 1 to 4 inclusive, 7 indicates a tubular shell or nipple made of a non-conductor of electricity, such as a refractory porcelain, or some similar substance which will not crack, crumble or disintegrate under heat. The nipple is preferably closed at one of its ends by the wall 35 and open at its other end as shown at 9. Adjacent the open end 9, the shell is enlarged as shown at 8 so that insulation-covered parts of the wire can be inserted in this portion, the end or termination of the enlarged portion 8 being formed with a circumferential bead 21. Located within the casing 7 is an elongated tubular piece of solder 10 or some other fusible material. A suitable flux such as resin may be combined with the solder, if desired. The solder 10 is provided with a longitudinal bore 17 within which the twisted ends 22 of one or more wires may be inserted. To facilitate the insertion of these wires in the bore 17 of the solder, one end of the bore may be flared as at 14. The inside of the shell 7 is roughened in any suitable way, such as for example, by the formation of threads 11. The function of these threads or other roughened formation is to engage the solder after it has melted and then hardened to anchor or hold the solder in the shell 7. Seated within the open end 9 of the shell 7 is a cup-shaped washer 12 which is made of asbestos or some similar heat-impervious or heat-resistant material. This washer 12 is provided with a relatively small central aperture 13 through which the bared ends 22 of the wires may be thrust, the aperture 13 being smaller in diameter than the insulation on the wiring so that the washer 12, located between the solder 10 and the end of the insulation, as shown in Fig. 3, protects the insulation from being damaged by the solder or heat thereof.

To apply one of the nipples to the ends of connected wires, or to the bared end of a single wire as an insulating protection, the bared ends of the wires are thrust through the aperture 13 in the washer 12 so that they project into the bore 17 in the shell in the solder 10. The outer face of the shell 7 is provided with a coating 15 of an inflammable intense heat-creating substance which is ignited to melt the solder. This substance may be one of several commercial products suitable for the purpose. For instance, it may consist of a composition or mixture of powdered aluminum, barium nitrate, gum and powdered iron. Another substance practical for the purpose is a mixture of potassium chloride, powdered iron and a shellac binder. The commercial product known as "Thermite" might also be used. The coating 15 is preferably placed on the outer surface of the shell 7 by dipping the shell in the mixture which is in a liquid or plastic state and which adheres to the face of the shell and dries thereon, forming a thin coating.

After the wires 19 and 20 have had their twisted ends 22 inserted into the shell as heretofore described, the inflammable substance 15 is ignited. This can be done with a match. The heat created by the burning substance 15 penetrates through the shell 7 and renders the solder 10 molten so that it fuses with the wires 22 and upon hardening securely engages with the roughened or threaded surface 11 on the inside of the shell. It is desirable to have the closed end 35 of the shell directed downward during the burning of the substance 15 so that the molten solder will not run out of the open end of the shell through the opening 13 in the washer 12.

To prevent the shell 7 from falling off the wires while so held, a retaining member 18 is provided in the form of a small flexible wire which is looped about the enlarged part 8 of the shell below the bead 21, this wire being temporarily wrapped about one or both of the wires 19 and 20 to hold the wires in the shell. The retaining wire 18 may be cut off after the nipple is secured in place on the wires 19 and 20 by the melting and hardening of the solder. When the solder is hardened it holds the nipple firmly on the end of the wires so that the nipple provides an insulating covering for, as well as a soldered joint between, the wires inserted in it. In other words, to provide an insulated and soldered joint between electric wires it is merely necessary for the electrician to insert the bared ends of the wires into the shell 7 and ignite the substance 15 with the flame of a match, and the job is done.

Through the use of this device, supplementary soldering means such as soldering irons and blow torches are dispensed with. The use of tape or other insulation and the consumption of time required for applying it is also avoided.

In Fig. 6 a modified structure is shown, wherein an insulating shell 23 is provided with two open-ended bores or channels 24 and 25. The inner surface of each of these channels is roughened, as by the screw threads 27. Located in each of the channels is a tubular piece of solder 26. The opposite ends of each channel contain a heat-insulating washer 28 provided with a conical aperture 29 through which the wires to be connected are inserted. The shell 23 is coated with an inflammable heat-creating coating 30 as described with respect to the structure of Figs. 1 to 4 inclusive.

In the structure of Figs. 5 and 6 four wires may be joined. That is to say, the ends of one pair of wires are inserted in the opposite ends of one of the channels in the shell 23, and the ends of another pair of wires are inserted from opposite directions in the ends of the second bore in the shell. When the inflammable substance 30 is ignited it melts the solder in both bores and unites the various ends of the wires in the two bores or channels of the shell. As the bores or channels in the shell are insulated from one another there is no electrical connection between the two pairs of wires.

Similarly, a shell may be constructed for uniting the ends of any reasonable number of wires.

It is herein stated that the inflammable substance or coating on the outer face of the shell should be ignited by means of a match. If desired, a phosporous substance, such as shown at 16, may be provided on the end of the shell. By rubbing this substance against a rough surface, it will be ignited and will serve to ignite the substance 15, causing it to melt the solder and unite the wires as previously explained.

What I claim is:—

1. An electrical connector comprising a tubular shell of insulating material which will not crack or melt under heat, said shell having a coating of an inflammable substance on its outer surface and containing a fusible material, so that the bared ends of wires inserted into the shell will be fused therein by the ignition of the inflammable coating.

2. An electrical connector comprising a refractory porcelain shell bearing an inflammable coating on its outer face and containing solder adapted to fuse with wires inserted into the shell, when the inflammable coating is ignited.

3. An electrical connector consisting of a tubular shell of non-fusible insulation closed at one end and open at the other end, a hardened heat-creating coating applied to the outer surface of the shell, a lining of solder contained within the shell, and a protective heat-impervious member located in one end of the shell.

4. An electrical connector comprising a tubular shell of insulating material of heat-resistant nature having a coating of an inflammable substance adherent to its outer face, a lining of a fusible material within the shell, and a closure member of heat-impervious material located in one end of the shell.

5. An electrical connector comprising a shell composed of insulating material, said shell being open at one end and closed at its other end, a tubular core of solder contained within the shell, a perforated heat-impervious closure member fitted into the open end of the shell, and a coating of heat-creating inflammable material on the outer face of the shell.

6. An electrical connector comprising a tubular shell of insulating material which will not crack or melt under heat, said shell having a coating of an inflammable substance on its outer surface, said shell containing a fusible material, so that the bared ends of wires inserted into the shell will be fused therein by the ignition of the inflammable coating, the interior of the shell being formed with an irregular surface to prevent separation of the fusible material from the shell.

7. An electrical connector consisting of a tubular shell of insulating material which will not crack or melt under heat, said shell having a coating of a heat-creating inflammable substance on its outer face, a fusible substance inside of the shell and means on the inside of the shell for preventing separation of the fusible substance from the shell after said substance has been melted and hardened.

8. An electrical connector consisting of a tubular shell of insulating material having a coating of a heat-creating inflammable substance on its outer face, a fusible substance inside of the shell, means on the inside of the shell for preventing separating of the fusible substance from the shell after said substance has been melted and hardened, and a heat-insulating disk located in one end of the shell.

9. An electrical connector consisting of a porcelain shell having a roughened interior and an open end, a tubular body of solder within the shell, an asbestos washer in the open end of the shell, and an inflammable heat-creating coating on the outside of the shell.

10. An electrical connector comprising a heat-resisting shell of material non-conductive of electricity into which the bared ends of wires are adapted to be inserted, a fusible material contained within the shell, an inflammable heat-creating coating on the outer face of the shell for the purpose of rendering the fusible material molten, and a flexible member secured to the shell for detachably engaging with the wires to hold the wires with their ends projected into the shell while the fusible material is in molten condition.

11. An electrical connector having a shell composed of a material non-conductive of electricity, said shell being closed at one end and open at its opposite end, an inflammable coating applied to the outer face of the shell, a solder core within the shell and means on the closed end of the shell for igniting the inflammable material to cause it to render the solder core molten.

12. An electrical connector comprising a shell of insulating material having several spaced channels extending through it, each of said channels containing a fusible material, heat-impervious means for partly closing the opposite ends of the channels and a coating of inflammable heat-creating substance on the outer face of the shell.

JULES J. BRELL.